March 28, 1961 D. I. KOSOWSKY 2,976,604

MEASUREMENT OF PIEZOELECTRIC CRYSTAL CHARACTERISTICS

Filed April 13, 1956

Inventor
David I. Kosowsky
by Robert S. Topenzer
Atty.

United States Patent Office 2,976,604
Patented Mar. 28, 1961

2,976,604

MEASUREMENT OF PIEZOELECTRIC CRYSTAL CHARACTERISTICS

David I. Kosowsky, West Newton, Mass., assignor to Research Corporation, New York, N.Y., a corporation of New York Filed Apr. 13, 1956, Ser. No. 578,124

1 Claim. (Cl. 29—155.5)

This invention relates to piezoelectric crystals for wave filters, and more specifically it relates to the measurement of certain characteristics of crystals which significantly affect the properties of such filters.

In addition to their use as frequency control elements for oscillators, piezoelectric crystals have also been used as circuit elements in wave filters, particularly wave filters of the band-pass type for which they are most ideally suited. Although, in general, the band-pass characteristics of a filter employing crystals, that is a crystal filter, will be superior to an equivalent filter which employs only capacitive and inductive elements, there has not been as wide a use of crystal filters as would ordinarily be expected under these circumstances. One of the main reasons for this is that hitherto the adjustment of the crystals to conform certain of their characteristics to predetermined values as called for in the filter design has involved such as a large amount of labor that the cost of each filter became excessive. Also conventional measuring techniques whereby these characteristic values of the crystals are established have not been sufficiently accurate in general to permit predetermined filter specifications to be met within reasonable tolerance limits. In many cases this has led to a trial and error process of selection of crystals for use in a particular filter design which is especially costly where only a relatively few units of like design are to be manufactured.

It is an object of this invention, therefore, to provide a technique for measuring characteristics of piezoelectric crystals which permits such characteristic values as are important in the realization of a particular crystal filter design to be established quickly and accurately.

As a concomitant to the foregoing, it is a further object of the invention to obviate much of the empirical practice generally associated wth the manufacture of crystal filters to predetermined specifications.

The novel features of the invention, together with further objects and advantages thereof, will become more readily apparent from the following detailed description of the invention wherein reference will be had to the accompanying drawings.

Figure 1:
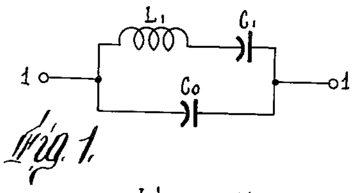
Fig. 1 is a schematic diagram of an equivalent circuit to represent a first piezoelectric crystal.
Figure 2:
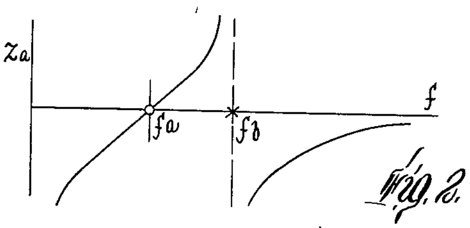
Fig. 2 is a graph illustrating the impedance characteristic of the crystal of Fig. 1.

With reference first to Fig. 1 those skilled in the art will recognize that the circuit therein illustrated is equivalent to a piezoelectric crystal in idealized form in that the resistive or dissipative component of impedance associated with the crystal has been omitted. Components $L_1$ and $C_1$ which are generally termed the series inductance and series capacitance, respectively, of the crystal are connected in series with one another between the terminals of the crystal 1—1, and component $C_0$ which is generally termed the shunt capacitance, is connected in parallel with the series combination of $L_1$ and $C_1$. The reactance $Z_a$ of the circuit of Fig. 1 as a function of frequency $f$ is plotted in Fig. 2. From Fig. 2 it will be observed that the circuit has two critical frequencies, namely a zero at frequency $f_a$, the resonant frequency of the crystal where the reactance $Z_a$ is zero, and a pole at frequency $f_b$, the antiresonant frequency of the crystal where the reactance $Z_a$ is infinite.

Figure 3:
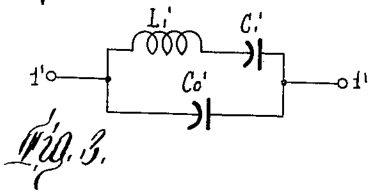
Fig. 3 is a schematic diagram of an equivalent circuit to represent a second piezoelectric crystal.
Figure 4:
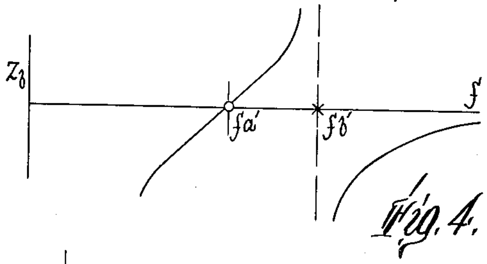
Fig. 4 is a graph illustrating the impedance characteristic of the crystal of Fig. 3.

Fig. 3 is an equivalent circuit of a second piezoelectric crystal similar to that of Fig. 1, the series inductance, series capacitance, and shunt capacitance, in this case being denoted by $L_1'$, $C_1'$ and $C_0'$, respectively. A plot of the reactance $Z_b$ of this circuit, which of course also has one zero and one pole, is shown in Fig. 4, the location of the zero being denoted by the frequency $f_a'$ and the location of the pole being denoted by the frequency $f_b'$.

Figure 5:
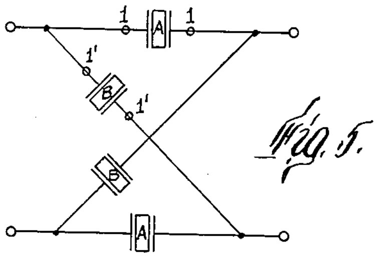
Fig. 5 is a schematic diagram of a crystal filter of lattice type configuration incorporating the crystal of Fig. 1 in each series arm and the crystal of Fig. 3 in each shunt arm.

Although the shunt capacitance of a crystal $C_0$ (or $C_0'$) can be measured accurately enough for most filter applications, hitherto the methods employed for measuring and adjusting the series capacitance $C_1$ or the series inductance $L_1$ (for a given resonant frequency, the one determines the other) have been generally inadequate. This is particularly true as regards the most general and hence the most common type of crystal filter configuration, namely a lattice filter which incorporates at least one crystal in each series arm, such as that represented by Fig. 1, and at least one crystal in each shunt arm, such as that represented by Fig. 3. A simplified form of this type of filter is illustrated in Fig. 5 where the individual crystals have been designated A and B. In a variation of this circuit two divided plate crystals (four terminals each) are utilized for the series and shunt arms respectively, instead of the four separate crystals as shown. In another variation, a hybrid equivalent circuit is used which has the same transmission characteristics as the lattice but requires only a single pair of crystals (as shown for example in the Bell System Technical Journal of October, 1937, pages 423–436). Whether or not either of these well known expedients is adopted, however, is immaterial, in principle at least, to the method of the present invention.

In any case, what is important, in addition to the establishment of the proper resonant frequencies for the crystals, is the adjustment of the series capacitance $C_1$ or more particularly the ratio of the series capacitance in each lattice arm namely $$\frac{C_1}{C_1'}$$

because this ratio directly affects the relative positions of the attenuation maxima of the filter. It is to the measurement and adjustment of this ratio that the present invention is primarily directed.

Figure 6:
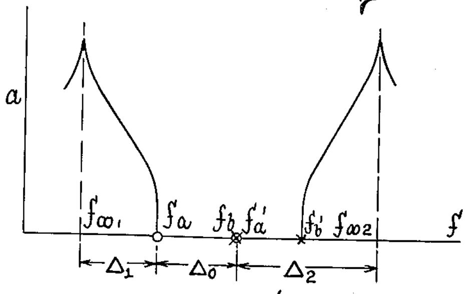
Fig. 6 is a graph illustrating the attenuation characteristic of the filter of Fig. 5.

With reference now to Fig. 6, where the attenuation $\alpha$ of the filter circuit of Fig. 5 is plotted as a function of frequency $f$, it will be observed that two attenuation peaks occur, one at frequency $f\infty_1$ and the other at frequency $f\infty_2$. The pass band of the filter is defined by frequencies $f_a$ and $f_b'$ and within the pass band are found the frequencies $f_b$ and $f_a'$ all of which correspond to the zeros and poles, respectively, of Figs. 2 and 4. In Fig. 6 the separation between $f_a$ and $f_a'$ has been designated by $\Delta_0$, the separation between $f\infty_1$ and $f_a$ has been designated $\Delta_1$, and the separation between $f\infty_2$ and $f_a'$ has been designated $\Delta_2$.

Since the attenuation peaks at $f\infty_1$ and $f\infty_2$ occur at frequencies where the reactance $Z_a$ of the crystal in each series arm becomes equal to the reactance $Z_b$ of the crystal in each shunt arm, it follows that:

$$Y_a = Y_b \text{ when } f = f\infty_1 \text{ or } f = f\infty_2 \tag{1}$$

where $Y_a$ equals $\frac{1}{Z_a}$ and $Y_b$ equals $\frac{1}{Z_b}$.

The same is true irrespective of the relative positions of the poles and zeros of crystals A and B, and therefore, it should be understood that the attenuation characteristic illustrated by way of example in Fig. 6 bears no relation whatever to the attenuation characteristic to be realized ultimately according to the method of the present invention. Thus $f_a'$ and $f_b$ need not coincide and in fact will not coincide initially in the usual case. Expanding $Y_a$ and $Y_b$ in terms of their equivalent circuit components as denoted in Figs. 1 and 3 Equation 1 may be written $$2\pi f C_0 - j2\pi f C_1 \frac{f_a^2}{(f\infty^2 - f_a^2)} = 2\pi f C_0' - j2\pi f C_1' \frac{f_a'^2}{(f\infty^2 - f_a'^2)} \tag{2}$$

where $f\infty$ equals $f\infty_1$ or $f\infty_2$.

In the case where $f\infty$ equals $f\infty_1$ Equation 2 becomes:

$$(C_0 - C_0') = \frac{C_1 f_a^2}{f\infty_1^2 - f_a^2} - \frac{C_1' f_a'^2}{f\infty_1^2 - f_a'^2} \tag{3}$$

and in the case where $f\infty$ equals $f\infty_2$ Equation 2 becomes:

$$(C_0 - C_0') = \frac{C_1 f_a^2}{f\infty_2^2 - f_a^2} - \frac{C_1' f_a'^2}{f\infty_2^2 - f_a'^2} \tag{4}$$

subtracting Equation 4 from Equation 3 and simplifying the result yields:

$$\frac{C_1}{C_1'} = \frac{f_a'^2}{f_a^2} \frac{(f\infty_1^2 - f_a^2)(f\infty_2^2 - f_a^2)}{(f\infty_1^2 - f_a'^2)(f\infty_2^2 - f_a'^2)} \tag{5}$$

An approximate form of Equation 5 may be obtained by writing:

$$\begin{aligned} f\infty_1^2 &= (f_a - \Delta_1)^2 = f_a^2 - 2\Delta_1 f_2 + \Delta_1^2 \\ f\infty_2^2 &= (f_a + \Delta_2)^2 = f_a'^2 + 2\Delta_2 f_a' + \Delta_2^2 \\ f_a'^2 &= (f_a + \Delta_0)^2 = f_a^2 + 2\Delta_0 f_a + \Delta_0^2 \\ f_a^2 &= (f_a' - \Delta_0)^2 = f_a'^2 - 2\Delta_0 f_a' + \Delta_0^2 \end{aligned} \tag{6}$$

Substituting Equation 6 in Equation 5 yields:

$$\frac{C_1}{C_1'} = \frac{f_a'^2}{f_a^2} \frac{\Delta_1}{\Delta_2} \frac{(\Delta_2 + \Delta_0)}{(\Delta_1 + \Delta_0)} \frac{\left[1 - \frac{\Delta_0}{2f_a' + \Delta_2}\right]}{\left[1 - \frac{\Delta_0}{2f_a + \Delta_1}\right]} \tag{7}$$

If in the bracketed expressions of Equation 7 $\Delta_1$ and $\Delta_2$ are neglected then Equation 7 becomes:

$$\frac{C_1}{C_1'} = \frac{f_a'}{f_a} \frac{1 + \frac{\Delta_0}{\Delta_2}}{1 + \frac{\Delta_0}{\Delta_1}} \tag{8}$$

or $$\frac{C_1}{C_1'} = \frac{f_a'}{f_a} \frac{1 + \frac{(f_a' - f_a)}{(f\infty_2 - f_a')}}{1 + \frac{(f_a' - f_a)}{(f_a - f\infty_1)}} \tag{8a}$$

The error involved in this approximation is negligible for all practical purposes since $\Delta_1$ and $\Delta_2$ will always be relatively insignificant as compared with $2f_a$ and $2f_a'$, respectively.

Figure 7:
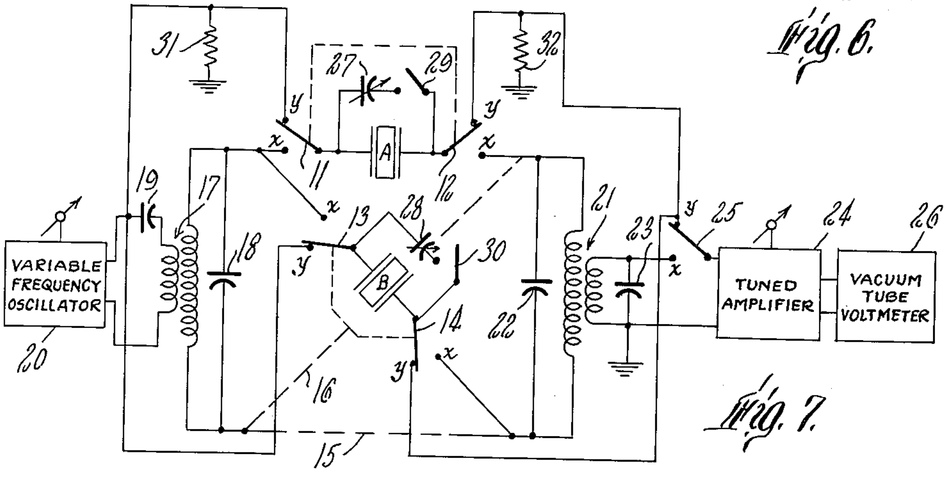
Fig. 7 is a schematic diagram of an illustrative form of measuring circuit suitable for carrying out the method of measurement according to the present invention.

In Fig. 7 there is shown an illustrative form of circuit to carry out the method of measurement according to the present invention. As shown in Fig. 7, with switches 11–14 in their $x$ positions, the crystals A and B of Figs. 1 and 3 are connected in a lattice (or bridge) configuration like that of Fig. 5, one each of the series and shunt arms being represented by the dotted lines 15 and 16, respectively, to simplify the drawing. In other words, dotted line 15 represents a crystal just like the series arm crystal A and dotted line 16 represents a crystal just like the shunt arm crystal B. In practice this result follows naturally from the use of divided plate crystals or the hybrid equivalent circuit mentioned heretofore. Connected to the one end of the lattice is an input circuit including a transformer 17 with a capacitor 18 across its secondary winding and a capacitor 19 in series with its primary winding, the latter in turn being connected to a variable frequency oscillator 20. Connected to the other end of the lattice is an output circuit which includes a transformer 21 having a pair of capacitors 22 and 23 connected across its primary and secondary windings respectively. This output circuit is in turn coupled to a tuned amplifier 24 through a switch 25 and the amplifier is coupled to a vacuum tube volt meter 26. Finally, a pair of calibrated variable capacitors 27 and 28 are connected across the crystals A and B through switches 29 and 30 respectively.

An additional circuit is provided between the oscillator 20 and the amplifier 24 whereby the individual crystals may be selectively connected directly between the oscillator and the amplifier. Thus, one of the output terminals of the oscillator is connected to the $y$ terminals of switches 11, 13 and the other output terminal of the oscillator is connected to a common point or ground. To complete the circuit there are provided individual connections from the $y$ terminals of switches 12 and 14 to the $y$ terminal of switch 25, and a pair of resistors 31 and 32. Resistor 31, which is of relatively low value (1–100 ohms depending on frequency), is connected from the ungrounded terminal of oscillator 20 to ground, and resistor 32, which has a value similar to that of resistor 31, is connected from the $y$ terminal of switch 12 to ground.

Figure 8:
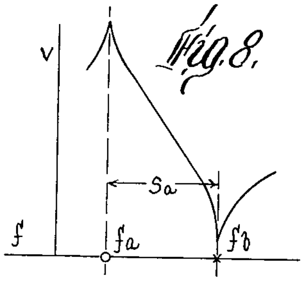
Fig. 8 is a graph illustrating the voltage output characteristic of the circuit of Fig. 7 when in a first condition.

In operation, switch 25 is placed in its $y$ position, switches 13 and 14 are placed in their $x$ positions, and switches 11 and 12 are placed in their $y$ positions. Under these conditions a simple measuring circuit is formed whereby the resonant frequency of crystal A may be measured or adjusted as required. To measure the frequency of crystal A, the frequency of oscillator 20 is adjusted until the indication provided by the vacuum tube voltmeter 26 is a maximum. This maximum corresponds to the resonant frequency $f_a$ of crystal A as indicated in Fig. 8. The resonant frequency of the shunt crystal B may be similarly measured if the relative positions of switches 11 and 12, on the one hand, and switches 13 and 14 on the other be reversed. Thus, switches 11 and 12 are placed in their respective $x$ positions, switches 13 and 14 are placed in their respective $y$ positions, and the oscillator is once again adjusted for a maximum indication of the vacuum tube voltmeter, such maximum corresponding to the resonant frequency $f_a'$ of crystal B.

Having determined the resonant frequencies of both the series and shunt crystals A and B which defines the value of $\Delta_0$ (Fig. 6), switches 11–14 are each placed in their $x$ positions, switches 29 and 30 are closed if this has not already been done, and switch 25 is moved to its $x$ position. Under these conditions the crystals are connected in a lattice configuration, the input end of the lattice being coupled to the oscillator 20, and the output end of the lattice being coupled to the amplifier 24 and vacuum tube voltmeter 26. Oscillator 20 is then set to a frequency which is less than the frequency $f_a$, and the capacitors 27 and 28 are adjusted for a minimum indication on the vacuum tube voltmeter, corresponding to an attenuation maximum. In this way, the frequency of maximum attenuation $f\infty_1$ (Fig. 6) is made to coincide with the oscillator frequency and $\Delta_1$ is caused to equal the difference between the oscillator frequency and the resonant frequency $f_a$. Next the oscillator frequency is increased until the other attenuation maximum or peak at $f\infty_2$ is located, the frequency difference between $f\infty_2$ and $f_a'$ corresponding to $\Delta_2$ in Fig. 6. The ratio $$\frac{C_1}{C_1'}$$

may now be determined by substituting in Equation 8 the values $f_a$, $f_a'$, $\Delta_0$, $\Delta_1$ and $\Delta_2$ as determined in the foregoing.

Thus far no mention has been made of optimum or reasonable values of $\Delta_0$, $\Delta_1$ and $\Delta_2$. An analysis of the measurement error which may arise from inaccuracies in the oscillator frequency indications discloses that the degree of accuracy to which the ratio $$\frac{C_1}{C_1'}$$

can be measured increases as $\Delta_1$ increases. On the other hand, when $\Delta_1$ is relatively large, it is difficult to distinguish the position of the attenuation peak at $f\infty_1$ because of system noise. In general, a good compromise is obtained when $\Delta_1$ is in the order of $10\Delta_0$. With respect to the frequency difference $\Delta_0$ itself, the choice of $\Delta_0$ will depend somewhat on the type of filter application for which the crystals are intended. If the crystals A and B are to be used in a narrow band filter then the frequencies $f_a$, $f_a'$ which define $\Delta_0$ can be the resonant frequencies called for in the filter design. If the crystals are to be employed in a wide band filter, however, their resonant frequencies will be too widely separated, and in this case two alternatives are possible.

According to one alternative, the resonant frequency of the crystal A as called for in the filter design is chosen as the frequency $f_a$ and the crystal B is adjusted to a frequency $f_a'$ about .1% of $f_a$ cycles ($\Delta_0$) above $f_a$. The ratio $$\frac{C_1}{C_1'}$$

is then measured and the crystals adjusted until the measured value of $$\frac{C_1}{C_1'}$$

is given by $$\frac{C_1}{C_1'}=\left(\frac{C_1}{C_1'}\right)_x\frac{f_a'}{(f_a')_x} \tag{9}$$

where $$\left(\frac{C_1}{C_1'}\right)_x$$

and $(f_a')_x$ are the values called for in the filter design. Accordingly, when the resonant freqnency of crystal B is subsequently raised to its ultimate value $(f_a)_x$ by further adjustment (grinding) of crystal B, then the series capacitance $C_1'$, will be correspondingly decreased so that the final ratio of the series capacitances of crystals A and B will be $$\left(\frac{C_1}{C_1'}\right)_x$$

as desired.

The second alternative for the wide band filter case is most useful where a pair of crystals have already been adjusted for use in a particular filter design, and it is a duplication of these crystals for additional filters of like design which is desired. If the crystals to be duplicated are denoted $A_s$ and $B_s$, then the first step is to regrind crystal $A_s$ until its resonant frequency $f_s$ is increased by an amount $\Delta_0$, where $\Delta_0$ is about .1% of $f_a$ cycles. As previously described, the circuit of Fig. 7 is collaterally adapted to measure crystal resonant frequency, and hence the resonant frequency of crystal $A_s$ may be measured and adjusted by simply substituting crystal $A_s$ for crystal A or B. Once the new resonant frequency of crystal $A_s$ has been established, crystal $A_s$ is substituted for crystal B in Fig. 7. Any crystal may now be made identical to crystal $A_s$ as it was before its resonant frequency was increased (the condition to be duplicated), by substituting such crystal for crystal A in Fig. 7, and adjusting it until its resonant frequency equals $f_s$ and the capacitance ratio $$\frac{C_1}{C_1'}$$

equals 1, as measure according to the procedure described in connection with crystals A and B. It is apparent crystal $B_s$ may serve as a standard to be duplicated by other crystals in similar fashion. The accuracy of measurement of the ratio $$\frac{C_1}{C_1'}$$

resulting from these techniques can be shown to be roughly 100 times greater than could be obtained hitherto, assuming the same accuracy of oscillator frequency indications.

Figure 9:
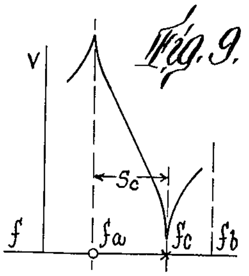
Fig. 9 is a graph similar to that of Fig. 8 with the circuit of Fig. 7 in a somewhat different condition.

With reference now to Figs. 8 and 9, it will be shown that collaterally the individual values of shunt capacitances $C_0$, $C_0'$, and series capacitance $C_1$, $C_1'$ of the crystals A and B may also be measured with the circuit of Fig. 7 in accordance with hitherto known procedure. To measure these parameters with respect to crystal A, for example, switches 13 and 14 are placed in their $x$ positions, switches 11 and 12 are placed in their $y$ positions, and switch 29 is opened. It will be recalled that this is substantially the same state of affairs which obtains when the resonant frequency of crystal A is to be measured. However, in this case it is necessary to measure the antiresonant frequency (pole) of the crystal A as well as its resonant frequency (zero), and to this end the frequency of the oscillator is adjusted until the vacuum tube voltmeter indicates a minimum corresponding to the frequency $f_b$ of Fig. 8. Next the switch 29 is closed and capacitor 27 adjusted to a predetermined value which will be denoted $C_t$. The effect of the capacitor 27 across the crystal is to decrease its antiresonant frequency to a new value corresponding to the frequency $f_c$ of Fig. 1. If $S_a$ is defined as the frequency difference between $f_a$ and $f_b$, and $S_c$ is defined as the frequency difference between $f_a$ and $f_c$ (as shown in Figs. 8 and 9), it can be shown that, $$C_0=\frac{C_t}{\frac{S_a}{S_c}-1} \tag{10}$$

$$C_1=\frac{2S_a}{f_a}C_0$$

from which the shunt capacitance $C_0$ and series capacitance $C_1$ may be easily calculated. The shunt capacitance $C_0'$ of crystal B may be determined in similar fashion by reversing the positions of switches 11 and 12 with respect to switches 13 and 14.

Although the method of measurement according to the present invention has been described in connection with an illustrative circuit which is collaterally adapted to measure resonant frequency and shunt capacitance, it is apparent that the circuit may be simplified considerably if it is to be used only for measuring series capacitance ratio. Various modifications of this nature which remain within the spirit and scope of the invention will no doubt occur to those skilled in the art.

Therefore, what is claimed is:

In a method of manufacturing a crystal filter with predetermined transmission characteristics, including at least a first piezoelectric element of known resonant frequency and a second piezoelectric element of known resonant frequency different from the resonant frequency of said first element and having its series capacitance related to that of said first element in a predetermined ratio, the steps of forming with each of said elements a test network having the transmission characteristics of a symmetrical lattice network, said transmission characteristics differing from those of said filter, measuring the frequencies of maximum attenuation of the network for relation with the resonant frequencies to determine the series capacitance ratio between said elements, adjusting the series capacitance of at least one of said elements to obtain said predetermined ratio, and forming with said elements said filter with said predetermined characteristics.

References Cited in the file of this patent

UNITED STATES PATENTS

| | | |
|---|---|---|
| 1,921,035 | Mason | Aug. 8, 1933 |
| 2,045,991 | Mason | June 30, 1936 |
| 2,364,501 | Wolfskill | Dec. 5, 1944 |
| 2,493,145 | Jaffe | Jan. 3, 1950 |

OTHER REFERENCES

Lowrie: "Lattice-Type Crystal Filter," Electronics, vol. 24, issue 4, April 1951, pp. 129–131.

Gerber: Proceedings of the I.R.E., vol. 41, No. 9, September 1953, pp. 1103–1112.